Patented Aug. 9, 1938

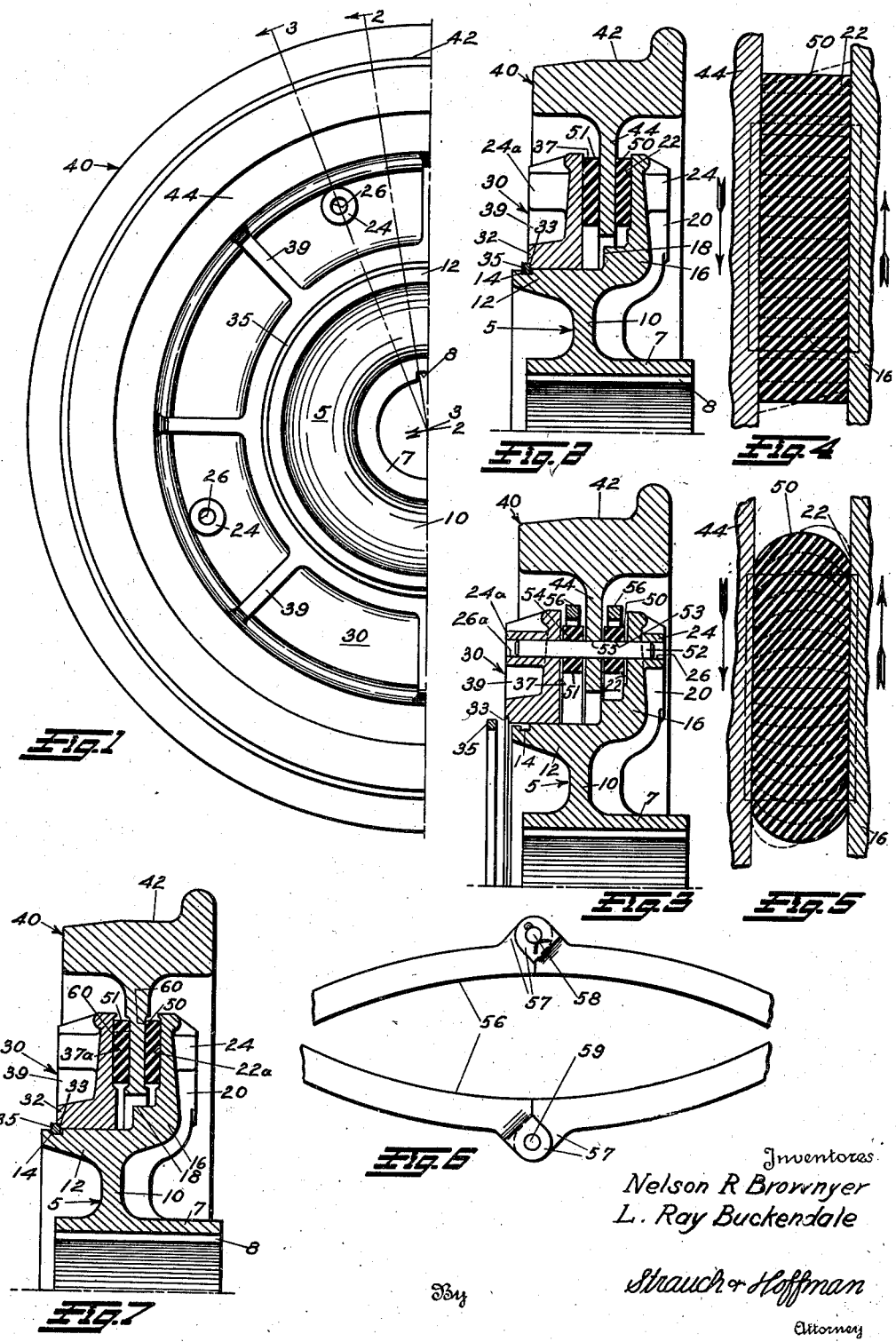

2,126,169

UNITED STATES PATENT OFFICE 2,126,169

RESILIENT JOINT FOR USE IN CAR WHEELS AND THE LIKE

Nelson R. Brownyer and Laurence Ray Buckendale, Detroit, Mich., assignors to The Timken-Detroit Axle Company, Detroit, Mich., a corporation of Ohio Application March 16, 1934, Serial No. 715,976

11 Claims. (Cl. 295—11)

The present invention relates to car wheels in general and more particularly to resilient car wheels.

The prior art shows a considerable number of resilient car wheels having a resilient material, such as rubber, interposed between inner and outer wheel members, and the resilient material is either adhesively secured to either or both of the inner and outer mmebers, or it is clamped therebetween in a dry condition.

It is disadvantageous to adhesively secure the resilient material to either or both of the inner and outer members because of the large bulk of the article that has to be handled, and also because of the length of time necessary to obtain adequate adhesion between the parts. These disadvantages are very important from the standpoint of production manufacture, and tend to greatly increase the cost of the wheels with the result that the use of such designs has been discontinued.

The next step in the development of the resilient car wheel consisted of interposing and clamping the resilient material in place between the inner and outer wheel members in a dry condition. It was thought, and proved to be correct that the friction between the metallic and resilient members of this type of wheel would, at least when the wheel is new, be sufficient to transmit any and all driving torque handled by the latter. The disadvantage of this type of wheel, however, is that rubber, which is ordinarily used as the resilient material in these wheels has a bulk modulus comparable to that of water, with the result that it is substantially incompressible, and therefore, any pressure which is exerted upon it will cause it to flow rather than compress. When the rubber is inserted between two metal plates in a dry or un-lubricated condition, and pressure is exerted thereon, the friction between the rubber and the metal will not permit the surface rubber to move or spread out over the surface of the plates, hence, the pressure exerted is expended in bulging the exposed surfaces of the rubber between the metal plates. In this stressed condition, there is a constant tendency for the surface of the rubber that is in contact with metal plates to expand, and thus relieve the unequal internal pressures. Where excessive deflection of the outer member with respect to the inner member of wheels of this character occurs, it has been found, that with respect to a section of the material, diagonally opposite corners of the rubber are pulled away from the metal, with the result that the rubber expands and reduces its bulge. This in turn reduces the pressure upon the rubber, which in turn lessens the friction between the rubber and the metal. After several such movements the rubber-metal pressure is reduced to such an extent that there is no longer sufficient friction to perform the required driving, and the wheels accordingly fail. This has been proven in a laboratory test where the rubber, in the form of segments, was placed between steel plates in a dry condition with a given known pressure. After moving the plates relatively to each other in the same manner that they would move in a car wheel as it rotated under a vehicle load, a loss of pressure of approximately one-third was measured after a very brief interval, even though the space between the plates was maintained constant throughout the test. A further test in an actual car in the field proved this point, when a wheel in which the rubber was assembled dry, and operated satisfactorily when new, failed after six thousand miles, the failure taking the form of slippage between the rubber and steel parts. The fact that a loss of pressure had taken place was apparent from an examination of the wheel, being evidenced by the final deflected position that the rubber assumed after slipping, and also from the fact that the wheel could not have operated six thousand miles satisfactorily without having a sufficient amount of pressure on the rubber initially to handle the torque load imposed thereupon in use.

It is accordingly a primary object of the present invention to devise a resilient joint for a car wheel or the like that is efficient and durable and yet which may be cheaply manufactured.

A further major object of our invention resides in the provision of a car wheel or the like with a novel resilient joint that has the parts thereof held together solely by a frictional bond, and yet that is durable and efficient.

It is another important object of our invention to so devise a resilient joint of the character wherein a resilient, deformable member is frictionally gripped between, and transmits force from one plate to another plate that no matter to what extent the plates may be relatively displaced the frictional force on the deformable member will not diminish in magnitude.

A further object is to devise a resilient joint having a deformable element disposed and frictionally clamped between a pair of members, and which is operable to automatically increase the frictional pressure when the members are relatively displaced.

Another object of this invention is to so produce a resilient joint of the type wherein a resilient element is frictionally gripped between a pair of members, that when the joint is unloaded, substantially no forces exist upon the engaging surfaces of the resilient element in the plane of its surface.

It is a further object to devise a resilient joint having a resilient element disposed in frictional engagement with a pair of members, which is so constructed that when it is under a condition of no load, substantially no forces exist in the resilient element that would tend to cause surface portions thereof to slip with respect to the members, and when it is loaded the forces set up in the resilient element tend to increase the frictional bond between it and the members.

Our invention also aims to devise a resilient joint for car wheels or the like, having a resilient element which is disposed in a state of deformation between a pair of members and yet in which the internal pressures are substantially completely balanced.

Another object of this invention is to devise a novel method of assembling a resilient joint of the character wherein a resilient element is clamped between a pair of members, and it is particularly concerned with providing means for permitting the resilient element to flow equally throughout its section when it is undergoing deformation during assembly.

It is another object of this invention to so design a resilient joint of the character wherein surface pressure between parts thereof establishes a frictional bond and transmits the forces therein, that when the joint is loaded, the surface pressure is increased, with the result that the capacity of the frictional bond is increased.

A still further object of our invention is to devise a novel resilient wheel, which is particularly useful in rail or like vehicles, but which is not limited to such use.

Another object is to devise a resilient car wheel that is so constructed that the load of the car or other vehicle thereon tends to increase the efficiency of the bond between the resilient material and the wheel parts.

Further objects will become apparent as the specification proceeds in connection with the annexed drawing, and from the appended claims.

In the drawing,

Figure 1 is a partial side elevational view of a car wheel embodying our invention.

Figure 2 is a sectional view of the wheel shown in Figure 1, the section being taken on the line 2—2 of Figure 1.

Figure 3 is a sectional view taken on the line 3—3 of Figure 1, but it illustrates the parts in their related positions before assembly, together with the addition of parts preferably employed to perform the assembly operation.

Figure 4 is an enlarged fragmental view in section, illustrating one of the resilient members of our device as it appears when assembled and the wheel is substantially under no load, the loaded relation of the parts being indicated by the dotted lines.

Figure 5 is a view similar to Figure 4, but it illustrates the parts as they appear when they have been assembled dry, or without lubricant.

Figure 6 is a fragmental elevational view of one of the ring members that is used during assembly of the wheel parts, and Figure 7 is a view similar to Figure 2, but illustrates a resilient car wheel of slightly modified form, also forming part of our invention.

With continued reference to the drawing, wherein like reference characters are used to designate the same parts throughout the several figures, our resilient wheel essentially consists of a central or hub member, an outer or tire member and a resilient device for connecting the two members. The center member, which is designated as 5 in the drawing, will now be described.

Center member 5 has a hub portion 7, which, in the present instance, has a keyway 8 for the purpose of attaching the hub to an axle shaft. Immediately surrounding hub portion 7 and extending radially outwardly is a web portion 10, which has extending therefrom a cylindrical flange portion 12, and the latter has formed in its outer surface, and in proximity to one end thereof, a groove 14. At the other end of said flange 12 there is an upwardly extending flange 16 which is stepped as at 18 and it is supported and stiffened by radial ribs 20, which extend from its outermost portion and terminate at the hub portion 7. The portions of ribs 20 which are disposed in alignment with the inner surface 22 of flange 16 are straight and parallel to the inner surface, and inner surface 22 constitutes one of the clamping surfaces to be described later.

Located substantially intermediate the inner and outer diameters of surface 22, and spaced at preferably equal circumferential intervals, four bosses 24 are formed on flange 16. Bosses 24 are apertured at 26 for a purpose to be described later.

Disposed upon the outer surface of cylindrical flange portion 12, and cooperating with flange 16 to provide an annular recess, is a clamping ring or plate 30, which is preferably substantially angular in section. The inner or hub portion 32 of ring 30 has a recess 33 at its outer inside corner, which is adapted to prevent a split locking ring 35, of square section, from coming out of groove 14 after assembly therein. The peripheral flange portion of ring 30 is very similar to the corresponding portion of flange 16, and is provided with a clamping surface 37, which is preferably disposed parallel to clamping surface 22 of flange 16. A plurality of preferably radially extending ribs 39, of substantial depth, are formed on the rear face of ring 30, and they are preferably integral with the hub portion 32 thereof and extend outwardly sufficiently to insure equally distributed pressure being exerted on surface 37 of ring 30. The outer faces of ribs 39 are preferably disposed in a plane that is located normally to the axis of the wheel for a purpose that will presently appear. It has been found that if this surface is not provided so that pressure may be exerted equally on the entire length of rib, a cocking action may take place when ring 30 is being assembled on flange 12, with the result that the resilient material may not be compressed equally throughout its section, and also portion 32 of ring 30 may not fit equally on the flange 12 throughout its area of contact. A plurality of bosses 24a similar in number to those formed on flange 16, are provided on ring 30 and have apertures 26a therein.

The outer or rim member 40 is composed of a rim or tire 42, having an inwardly extending annular web portion 44. The inside diameter of annular portion 44 is such that it is spaced a definite distance from stepped portion 18 of flange 16, and is so dimensioned that the resilient material will not extend beyond it. Interposed between flange 16 and one side of the web portion 44 is a resilient member 50. A similar resilient member 51 is disposed between the outer side of web portion 44 and flange 37. Members 50 and 51 are maintained in clamped relationship between members 30, 16 and 44 by means of locking ring 35, and the frictional bond thus established takes all supporting and driving loads.

Stepped portion 18 of flange 16 is so dimensioned that in the normal or unloaded condition of the wheel position there is a certain distance between it and the inside diameter of web portion 44 of the outer member. When the wheel is loaded portion 18 is eccentrically deflected with respect to web 44, but there is nevertheless a clearance between them, with the result that tire member 40 is isolated from center member 5. This distance is so predetermined that the parts will contact under excessive loads, with the result that deflection of the wheel cannot be excessive. Although stepped portion 18 has been illustrated as a continuous surface, it may be formed as a series of lugs if desired and a satisfactorily operating structure obtained.

The wheel parts may be assembled in any suitable manner, but we preferably employ a novel method of assembly that is extremely easily and inexpensively performed and which results in a resilient joint that is far superior to those heretofore devised.

With reference now to Figure 3, we have illustrated the parts as being disposed in proper axial alignment for assembly, and we have also shown a plurality of positioning or locating pins 52 disposed in apertures 26 and 26a of flange 16 and ring 30. Pins 52 extend through apertures 53 and 54 formed in rings 50 and 51 respectively and also apertures 55 formed in web 44, and serve to locate all of the parts in accurate angular relationship and maintain them in this condition while the assembling operation is being effected. We have also shown a pair of assembling rings 56 associated with the parts and they have an axial width that is slightly less than the final compressed width of members 50 and 51. Rings 56 are preferably constructed so as to have complemental halves which may be expanded or contracted at will, and in Figure 6, we have illustrated one manner in which the halves of the rings may be detachably connected. With continued reference to this figure, the ring sections are provided with lug portions 57, which are hinged together by a pin 58. The opposite ends of the ring sections are adapted to be releasably secured together by means of a pin 59 which passes through registering apertures therein.

The assembling operation is preferably carried out in the following manner.

Prior to disposing the parts in the condition shown in Figure 3, pins 52 are inserted in apertures 26 in flange 16, and the clamping surfaces of flange 16, ring 30 and web 44 are given a liberal coating of a suitable lubricant, either of the liquid, semi-liquid or solid type. Although any substance having the requisite lubricating properties may be used, we prefer to use a petroleum jelly of the character commonly sold on the market under the trade name Vaseline in our novel method, as it has proven to be an entirely satisfactory lubricant.

Resilient member 50 is then placed in position on pins 52 and then rim member 40 is assembled with web 44 disposed on pins 52, and then resilient member 51 and ring member 30 are placed on pins 52. Although both sides of members 50 and 51 may also be coated with Vaseline prior to assembly, we find that it is merely necessary to lubricate clamping surfaces 22 and 37 and web 44 to obtain good results.

Assembling rings 56 are then placed around the periphery of resilient members 50 and 51 and locked in place, and the wheel is ready for the final assembling operation. This operation consists of forcing ring member 30 onto flange 12 and consequently deforming resilient members 50 and 51 and then snapping locking ring 35 in place in groove 14, and although it may be carried out in several ways, we preferably employ the following procedure.

The wheel is laid upon a fixture having a flat annular surface co-extensive with the flat portions of ribs 20 and in surface engagement therewith. A member having a flat annular surface is then brought up into engagement with the flat surfaces of ribs 39 of ring 30, and at this time the sections of resilient members 50 and 51 assume the configuration indicated by the dashed lines in Figure 4. Pressure is then exerted upon the wheel parts with the result that ring 30 is pressed on flange 12 and resilient members 50 and 51 are clamped between their clamping surfaces, and as the latter are lubricated, the surfaces of the resilient members, when the latter are deformed under the influence of pressure, slide evenly upon the clamping surfaces as indicated in Figure 4. With continued reference to this figure, those surface portions of member 50 that lie outside of the center of the section move outwardly over the clamping surfaces as pressure is applied, and those surface portions that lie inside the center of the section move inwardly. Accordingly, the resilient material of members 50 and 51 flows evenly throughout its section as pressure is applied, with the result that when final pressure conditions are attained, substantially no bulge exists and members 50 and 51 lie in full surface engagement with their clamping surfaces, as illustrated in full lines in Figure 4.

It should be observed in connection with this operation, that ribs 20 and 39 of members 16 and 30 serve to transmit a substantially uniformly distributed pressure to clamping faces 22 and 37 respectively, with the result that resilient members 50 and 51 are evenly deformed throughout their circular extent. Ribs 20 and 39 also perform the function of maintaining the resilient members in proper deformed condition after the wheel has been removed from the press.

Ring 30 is pressed on flange 12 until its hub portion 32 is brought into alignment with the right hand wall of groove 14. Although the final pressure attained during the pressing operation will, of course, vary according to the size and type of joint that is involved, we find that with the wheel illustrated, a pressure of approximately forty tons is satisfactory. Ring 35 is then snapped into groove 14 and pressure is relieved, which allows ring 30 to move back slightly so as to cause lock ring 35 to be embraced by groove 33 thereof. With the parts in locked condition, should locking ring 35 break in service, the parts thereof would nevertheless be restrained against coming out of groove 14 by the outer wall of groove 33, and the wheel is accordingly rendered entirely safe.

The location of grooves 14 and 33 are predetermined so that when the correct pressure is attained during the pressing operation, they will be correctly disposed with respect to each other so as to enable locking ring 35 to be brought into locking relationship therewith. We have not described the action of rings 56 in the above operation, for if the parts were sufficiently accurately machined, it would not be necessary to use them. We have found, however, that because of slight machining errors, or the impossibility of obtaining absolutely flat clamping surfaces on members 16, 44 and 30, the rubber tends to "shoot outwardly" or escape from between the plates at any point where the pressure is lower than that at any other point, when pressure is applied to the wheel during assembly thereof. Assembly rings 56 accordingly function to confine the rubber against "shooting out".

After the assembled wheel has been removed from the press it is then aged sufficiently long to allow the lubricant to evaporate, dry, or be absorbed by the rubber to such an extent as to increase the coefficient of friction between the parts sufficiently to insure that they will not slip relatively to each other under the loads to which the wheel is subjected in operation. Assembling rings 56 and pins 52 are then removed and the wheel is ready for use. If desired, however, the wheel may be installed in the car or other vehicle in which it is to be used immediately after removal from the press, and rings 56 and pins 52 removed therefrom after the aging period has expired. In either event the length of the aging period depends upon the nature of the lubricant employed. When Vaseline is used as the lubricant, we find that an aging period of several days is satisfactory. If desired the completed wheels may be heat treated in an oven heated to a suitable temperature to accelerate the drying of the lubricant, but we find that it is satisfactory to age the wheels at room temperature. We have found that if the completed wheels are placed in an oven heated to a temperature of approximately 200° F., they may be removed at the end of approximately two and one-half hours as the frictional bond between the parts has been found to be sufficient at the end of this time. On the other hand, the Vaseline or other lubricant may be heated just prior to applying it to the joint parts to accelerate the drying or absorption thereof and thereby shorten or eliminate the oven or other aging process.

We are aware that Vaseline or other lubricants have been heretofore utilized to assemble rubber parts with metal parts where the rubber is placed in a cavity that makes assembly difficult. In other words a lubricant has been heretofore used for the purpose of making assembly possible, whereas the lubricant employed in the present invention does not assist the assembly operation in the least, but operates solely to produce a novel and more serviceable product. The assembly difficulties are as a matter of fact increased by using a lubricant in the present invention as it is necessary to provide means for maintaining the parts in proper assembled relationship until the effects of the lubricant have disappeared.

With further reference to the lubricant employed, it may, as has been previously stated, be of any suitable character, provided that it will remain between the parts and continue to lubricate the parts until the final pressure has been attained. Although the lubricant that we employ does not effect an adhesive bond between the parts after it has dried, a rubber cement or the like may be employed to perform the dual function of lubricating the parts during assembly, and for augmenting the frictional bond after it has set, and the appended claims are intended to embrace lubricants of this character.

The advantages of employing a lubricant in the present assembly will now be set forth, and in order to more clearly set forth the differences between it and the prior "dry" resilient joints, we will describe the action that takes place in the "dry assembled" wheel shown in Figure 5.

In exerting a pressure of nominal value per unit area on the wheel of Figure 5, there are two elements that resist this pressure, namely, the tendency for the rubber to retain its normal shape and the friction between the rubber and steel parts which resist the spreading of the rubber so as to cover a larger area of the metal parts. With reference to the assembly shown in Figure 5, the area of the plates contacted by the rubber after the assembling operation is not substantially greater than that before the assembling operation because the high degree of friction between the rubber and steel parts prevents the rubber from spreading over the face of the plates as it is undergoing deformation. The deflection of the body of the rubber from its initial condition is illustrated by the curved strain lines in this figure. Upon casual observation the only change that has taken place in assembling the wheel is a slight reduction in the thickness of the rubber with a resulting bulge at its exposed edges. Inasmuch as the load-carrying ability and torque capacity of the wheel depend upon the pressure being maintained on the rubber so as to create sufficient frictional bond between the rubber and steel parts, great care must be maintained that the wheel be assembled in such a manner that there will be no great loss in pressure with length of service of the wheel.

Due to the constant off-center deflection of the wheel when in use, the diagonally opposed upper and lower edges of the rubber element in Figure 5 tend to pull free from the metal surface, against which it is tightly pressed. The rubber accordingly tends to creep and spread out over larger areas of the metal faces, and a lessening in the amount of bulge is apparent from the dotted lines shown in Figure 5, which illustrate the deflected condition of the wheel. This action results in a loss of pressure along the entire face of the rubber which is reflected in a loss of friction between the rubber and steel parts, and as a result the load-carrying ability and torque absorbing qualities are greatly impaired. Moreover, referring to the curved "strain" lines in Figure 5, which indicate the extent to which the rubber has been deformed, it is observed that the extremities thereof tend to pull away from or spread with respect to the surfaces of the steel plates in a direction away from the center of the section, with the result that when relative movement of the plates takes place, these forces increase the tendency of the rubber to slip and spread out over the surface of the plates.

However, by assembling the wheel according to the present invention, as described in connection with Figure 3, lubricating the surfaces reduces the friction between the rubber and the metal parts to a very small value, thereby allowing the preponderance of pressure to be utilized in deforming the rubber, as seen in Figure 4, rather than trying to overcome the friction between the rubber and metal surfaces. There are, moreover, substantially no stresses present in the rubber that would tend to cause it to spread over the surfaces of the plates. This is indicated in Figure 4 as the strain lines are substantially straight, as distinguished from the curved strain lines seen in Figure 5. The assemblies as shown in Figures 4 and 5 are drawn substantially to scale and in each instance the total pressure upon the rubber is the same, and as the plates are spaced a greater distance in Figure 5, it is apparent that the greater part of the pressure applied to the rubber is utilized in deforming it, whereas in Figure 4, substantially all of the pressure applied to the rubber is utilized in causing it to flow over the faces of the plates. After assembly, there is very little bulge in any of the exposed edges of the rubber, but there is a marked reduction in the thickness. In this assembly, at such time as the hub is loaded and the rubber members are distorted and tend to pull free at the edges, the rubber tends to assume its natural shape and pulls toward the center of the section, thereby reducing the area of contact and any change that takes place in the amount of pressure on the rubber will be an increase rather than a decrease as is the case of the dry-assembled wheel. This condition is illustrated in Figure 4. It has been definitely determined that the ratio of reduction in thickness of rubber, when assembled with the Vaseline, as against that which is assembled dry, varies from 4 to 1 at lower pressure to approximately 2½ to 1 at the maximum pressure which is required in this assembly.

Although we have illustrated rings 50 and 51 as cooperating directly with flange 16, heat insulating elements may be interposed therebetween for minimizing the transfer of heat from the wheel to the rubber if desired, without departing from the spirit of our invention.

The main advantage of our lubricant assembled wheel over the dry-assembled wheel is that in service the constant deflection to which they are subjected, and which causes a lessening of the total pressure of the dry-assembled wheel, causes the total pressure of the lubricant assembled wheel to automatically increase, which accordingly increases the efficacy of the frictional bond between the wheel parts.

Although we have illustrated the clamping surface of the present resilient joint as being flat, it is to be understood that they may be cone shaped or have other configurations if desired without departing from the spirit of our invention.

Although we have illustrated our novel resilient joint as being embodied in a car wheel, it is to be distinctly understood that the invention is not limited to such use and that we contemplate utilizing it wherever a resilient joint may be desired, for instance it may, with suitable modifications in the proportions of its parts, be used in universal joints, torque rods, resilient gears or shafts, or other installations, and we intend the appended claims to embrace our invention when it is used in this manner. Moreover, members 50 and 51 have been illustrated as formed as rings, but it is to be understood that they may be constructed as blocks or segments, with one assembly pin per segment, if desired and a satisfactorily operating joint obtained.

With reference now to Figure 7 of the drawing, we have illustrated the wheel of Figures 1, 2 and 3 as having a modified form of resilient joint incorporated therein, also forming part of our invention, and the major difference thereof resides in the fact that its design renders assembling rings unnecessary for its assembly.

With continued reference to this figure, the clamping surface 22a and 37a of members 16 and 30 are made in the form of grooves, and similar grooves 60 are formed in web 44 of rim member 40. As the outer walls of grooves 22a, 37a and 60 constitute abutments, which are capable of inhibiting the flow of rubber outwardly over the surface of the metal members when the resilient members are undergoing deformation during the assembly operation, it is not necessary to employ assembling rings with this form of our invention.

The width of the plane faces of grooves 22a, 37a, and 60 is preferably such, that when clamping ring 30 has been pressed on the wheel to permit assembly of locking ring 35, rubber members 50 and 51 will just contact inner and outer corners of the grooves. Thus, when the pressure is relieved, and clamping ring 30 recedes to contact locking ring 35, the rubber will recede from the corners of the grooves. Although it is not necessary to dimension the parts in the manner just described in order to obtain an operable structure, we preferably do so in order to insure that the corners of the grooves will not set up any restricting action upon the rubber when the wheel undergoes deflection during operation.

With reference to all of the forms of our invention, we desire it to be understood that although we have illustrated the clamping members as being carried by the inner joint member, the relationship of the parts may be reversed if desired, and the clamping members associated with the outer member without departing from the spirit of our invention. Moreover, the parts may be multiplied if desired, for instance, three or more resilient members may be incorporated in a joint having three or more clamping members and the appended claims are intended to embrace our device when it is embodied in this form.

As previously described, the rubber elements utilized in a dry assembled wheel spread out over the faces of the plates after the wheel has been in use and thereby lessen the driving pressure, with the result that if these are taken out of service and tightened up periodically to increase the driving pressure they can be made to ultimately give satisfactory operation, and we desire it to be understood that the appended claims are intended to embrace resilient joints wherein as a final condition, the rubber elements are spread out over the plates, irrespective of whether this condition is attained by lubricating the elements prior to assembly, or by assembling them dry and operating upon the assembled joint so as to cause the elements to spread out over the plates.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent, is:

1. In a resilient joint of the character wherein a resilient element is disposed, and is maintained in a state of substantial deformation between a pair of members providing clamping faces, the method of manufacturing such joint which comprises assembling said element with said members, introducing a lubricant between said element and members, and moving said members relatively in a direction normal to their clamping faces to cause said members to clamp said element in such manner as to effect substantially equal flow of said element throughout its section as it is undergoing deformation between said members, and then locking said members in definite spaced relation.

2. In a resilient joint of the character wherein a resilient member is disposed and maintained in a condition of substantial deformation between a pair of plate-like members, the process of making such joints which comprises coating said element or said members with a lubricant, forcing said members toward each other in a direction normal to their surfaces to clamp and deform said element therebetween, and then locking said members against movement away from each other.

3. The process described in claim 2, together with the step of restraining said members and said element against relative angular movement, at least when said element is undergoing deformation between said members.

4. The process described in claim 2, together with the step of restraining said element against improper deformation at least when it is being clamped between said members.

5. In a resilient joint of the character wherein a resilient element is disposed and maintained in a condition of considerable deformation between a pair of substantially flat members, the process of making such joints, which comprises lubricating said members and/or said element, interposing said element between said members, forcing said members toward each other in a direction normal to their clamping surfaces, and thereby clamping and deforming said element therebetween, locking said members against separational movement, and then operating upon the joint to remove the lubricant therefrom and develop a comparatively high coefficient of friction between said element and said members.

6. The process described in claim 5, wherein the lubricant removing step comprises aging said joint.

7. In a joint of the character wherein a resilient element is clamped and disposed in a condition of substantial deformation between a pair of members providing substantially flat clamping faces, the process of making such joint which comprises lubricating said members so as to cause said element to deform and spread out over considerable areas of said members as the latter are brought towards each other in a direction normal to their clamping faces, and then locking said members against separating movement.

8. The process set forth in claim 7, wherein said lubricating step comprises applying a semiliquid lubricant to said element, for causing the engaging surfaces of said members and said element to slip relatively freely upon each other during deformation of said element.

9. In a resilient car wheel of the character wherein a wheel member having an inwardly extending flange is connected to a hub portion having a pair of clamping members by means of a plurality of resilient elements which are disposed and maintained in a state of deformation between said flange and said clamping members and which are operable to work solely in shear, the process of making such car wheel which comprises lubricating said flange, said clamping members or said resilient elements, forcing said clamping members toward each other in a direction substantially parallel to the axis of said wheel, so as to clamp said resilient elements between the same and said flange, and then locking said clamping members against separation.

10. In a car wheel, a rim part having an inwardly extending flange portion provided thereon, a hub part disposed within said rim part and having a pair of clamping members carried thereby and which overlap said flange portion, and a plurality of resilient elements disposed and maintained in a condition of deformation between said flange and said clamping members, said resilient elements being uniformly stressed between said flange and said clamping members whereby all of the incremental areas of the engaging surfaces of said resilient elements are operable to yieldingly oppose relative movement of said rim with respect to said hub in directions substantially parallel to the clamping faces of said flange and said clamping members with forces of substantially equal magnitude.

11. In a resilient joint of the character wherein a generally circular resiliently deformable element is clamped and maintained in a state of substantial deformation between a pair of members providing opposed substantially parallel clamping faces, the method of manufacturing said joint which comprises assembling said element with said members by moving said members relatively towards each other in a direction normal to their clamping faces, lubricating said element and/or said clamping faces, interposing said element between said members, forcing said members toward each other in a direction normal to their clamping faces, to thereby clamp and deform said element therebetween, and simultaneously engaging said element around its periphery in order to prevent improper flow thereof, and then locking said members against movement away from each other.

NELSON R. BROWNYER.
L. RAY BUCKENDALE.